Figure 1:
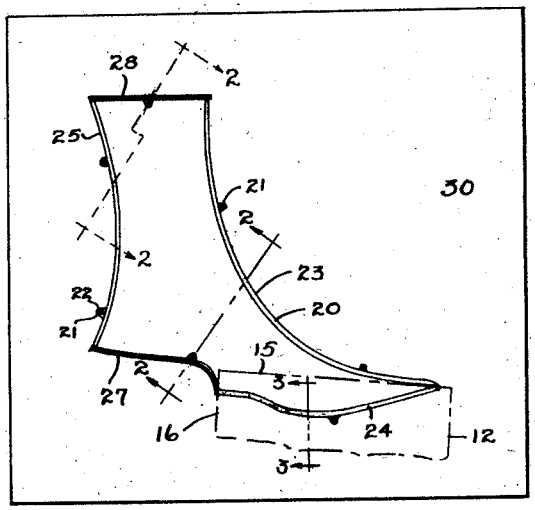

Nov. 13, 1928.

F. T. ROBERTS ET AL 1,691,253

OVERSHOE AND METHOD OF MAKING SAME

Filed March 28, 1925   3 Sheets-Sheet 1

Nov. 13, 1928.　　　　　　　　　　　　　　　　　　1,691,253
F. T. ROBERTS ET AL
OVERSHOE AND METHOD OF MAKING SAME
Filed March 28, 1925　　　3 Sheets-Sheet 2
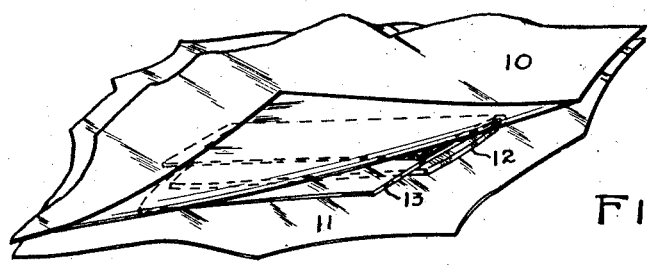
FIG.-4
FIG.-5
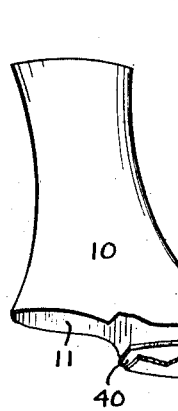
FIG.-6
FIG.-7
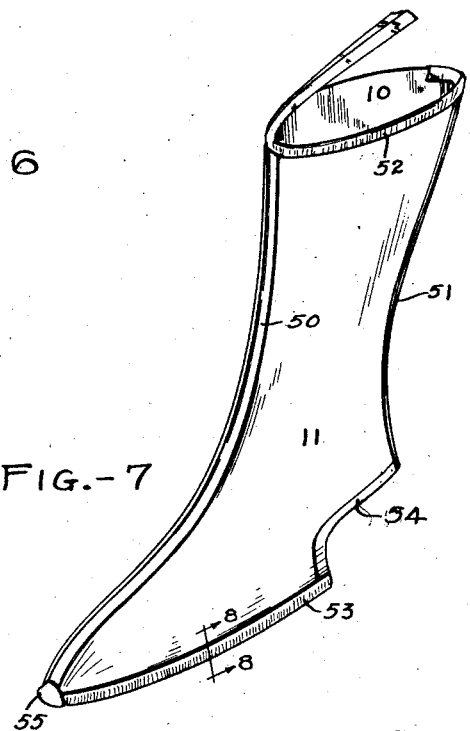
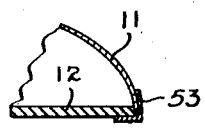
FIG.-8
Inventors
Fred Thomas Roberts
Albert J. Elson
By
Bates, Macklin, Goebrick & Hearn Attorneys Nov. 13, 1928.  
F. T. ROBERTS ET AL  
1,691,253  
OVERSHOE AND METHOD OF MAKING SAME  
Filed March 28, 1925 3 Sheets-Sheet 3

Inventors  
Fred Thomas Roberts  
Albert J. Eldon  
By  
Baker, Macklin, Goebel, Fear Attorney Patented Nov. 13, 1928.

1,691,253

UNITED STATES PATENT OFFICE.

FRED THOMAS ROBERTS, OF YONKERS, AND ALBERT J. ELDON, OF MOUNT VERNON, NEW YORK, ASSIGNORS TO PARAMOUNT RUBBER CONSOLIDATED, INC., OF TUCKAHOE, NEW YORK, A CORPORATION OF DELAWARE.

OVERSHOE AND METHOD OF MAKING SAME.

Application filed March 28, 1925. Serial No. 18,933.

This invention relates to a method of manufacturing sheet rubber footwear, as overshoes, gaiters, sandals etc. as well as the article thus produced, which is made up of a suitable sole and a thin elastic upper, the parts of which are joined together at the front and to the edges of the sole by seams formed mechanically under pressure, after which the article is vulcanized.
In accomplishing the desired result of rapidly and economically cutting out of the parts and joining them by machinery, we avail ourselves of an invention by the present applicant F. T. Roberts, described and claimed in his application No. 712,505, filed May 12th, 1924. That application sets forth an operation involving the superimposing of two sheets of rubber and the insertion between them, for a portion of their area, of a doubled sheet with its opening between its leaves facing outwardly, and cutting through such pile of sheets with an outline die which is formed to join each outer sheet to one layer of the doubled sheet where the doubled sheet is present and in another region join the two outer sheets directly together. In such operation raw rubber stock is employed which is treated so that it will not adhere except under pressure.
Starting with the Roberts process above briefly described, we have discovered that it may be adapted for the efficient manufacture of footwear by providing the top and bottom sheets of the pile suitable for the upper of the overshoe, and insert a suitable doubled piece for the sole, which doubled piece after the article is cut out is folded flat transversely of the sheets, after which the parts are vulcanized.
We have also discovered that by making the outline or circuitous die which does the cutting and seaming of a form which in certain regions makes a seam between the sheets and cuts through them beyond the seam and in another region cuts through sheets without making a seam, we can make the necessary junctions while leaving the article open at the top and at the heel portion, and at the back if desired. By this very simple means, we make a rubber overshoe, gaiter or sandal having a thin elastic upper and a heavier sole to receive the wear while an opening is provided for the shoe heel. The overshoe thus produced is light enough to be readily folded and carried in one's pocket or hand bag, while it has wearing qualities sufficient to make it effective as a temporary protection for shoes.

Various refinements of our invention, as well as its more essential features, will be apparent from the description hereinafter given of the preferred method of operation and the illustrations of various forms of footwear resulting therefrom.

Figure 2:
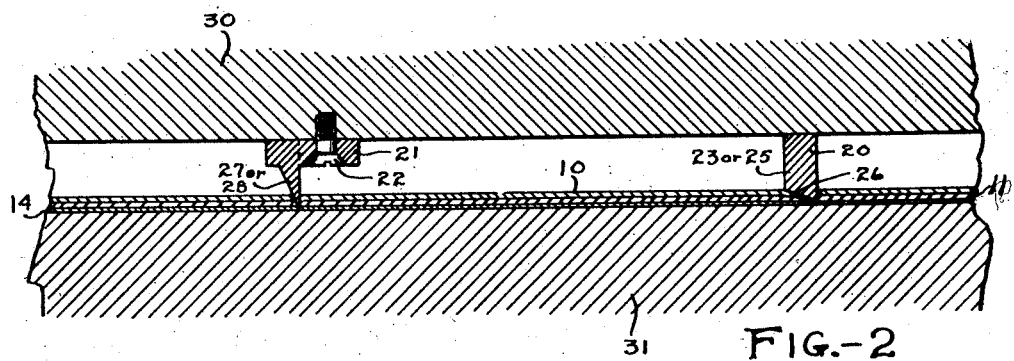
Figure 3:
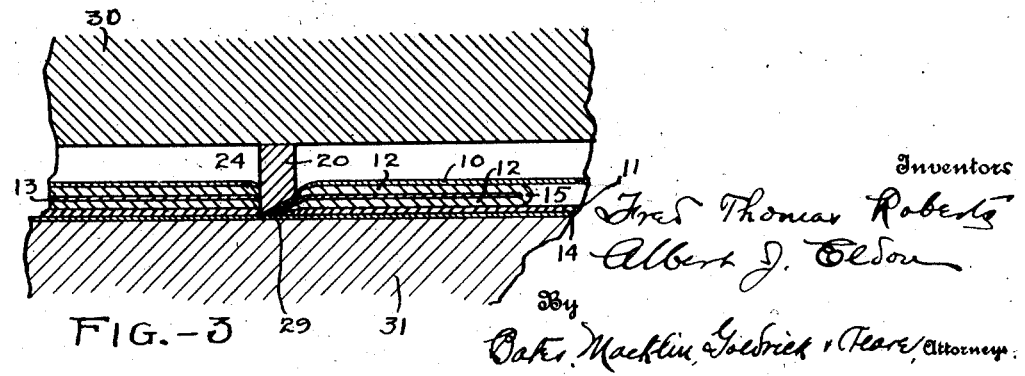
Figure 9:
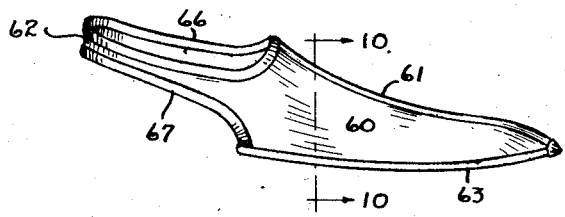
Figure 10:
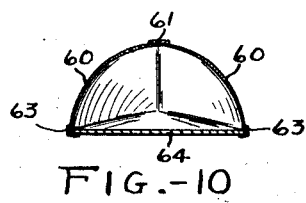
Figure 11:
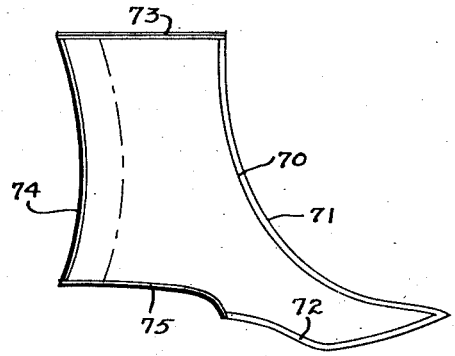
Figure 12:
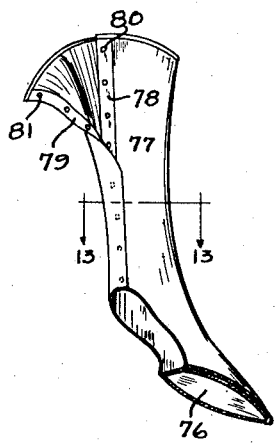
Figure 13:
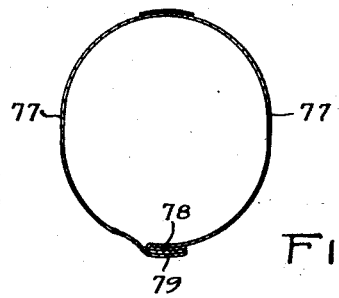

In the drawings, Fig. 1 is a bottom plan of a cutting die specifically for use in making a gaiter with a leg portion, this view illustrating in broken lines the position of the doubled insert for the sole; Fig. 2 is an enlarged cross-section on the line 2—2 on Fig. 1; Fig. 3 is an enlarged cross-section on the line 3—3 on Fig. 1; Fig. 4 is a perspective of sheets adjacent the sole portion before the cutting takes place; Fig. 5 is a plan of a temporary insert of paste-board or similar material for holding the sole flat during vulcanization; Fig. 6 is a perspective, partly broken away, of the gaiter parts cut and joined by the die of Fig. 1, with the temporary sole inserted; Fig. 7 is a perspective on a larger scale of the gaiter after certain reinforcements have been applied; Fig. 8 is a detail in cross-section through such gaiter, as indicated by the line 8—8 on Fig. 7; Fig. 9 is a perspective of a rubber sandal which may be made by the same method; Fig. 10 is a cross-section of such sandal on the line 10—10 of Fig. 9; Fig. 11 is a plan of a die for cutting out a gaiter which opens at the back; Fig. 12 is a perspective of such gaiter showing the back provided with snap fasteners for holding it together; Fig. 13 is a cross-section of the gaiter of Fig. 12, as indicated by the line 13—13 on that figure.

In Figs. 2, 3 and 4 we have indicated a pile of surmounting sheets from which the article is cut and joined in one operation. This pile comprises a top sheet of rubber 10, a bottom sheet 11, an intermediate doubled sheet 12, having its two leaves separated by a paper separator 13, and the whole pile resting on a bottom sheet of paper 14.

The cutting die, shown at 20 in Figs. 1, 2 and 3, consists of an outline strip of metal having a course corresponding approximately to the contour of the article to be thereby produced. This circuitous strip is preferably secured to the underside of the top platen 30 of a suitable press and coacts with the smooth top surface of a lower platen 31. The die is shown as provided with suitable means for securing it to the top platen, namely, ears 21 through which screws 22 pass into the platen.

The die shown in Fig. 1 has a front concave reach 23, a bottom or sole convex reach 24 and a back reach 25, all of which portions have their active edges inwardly beveled (as indicated at 26 in Fig. 2, or 29 in Fig. 3), while the rest of the die comprises a concave heel portion 27 and a straight top portion 28 which are formed with sharp edges to cut through the material.

It results from the peculiar formation of the die described that where there is the inward bevel, as 26 or 29 as on the portions 23, 25 and 24, an effective seam is formed by the pressure of the dies between the adjacent rubber leaves while the excess material is cut off outside of such seam, while the sharp portions 27 and 28 cut through the material without forming a seam.

It will be seen from an inspection of Figs. 2 and 3 that the bevel 26 of the die portions 23 and 25 is comparatively slight, but is sufficient to firmly press a portion of each sheet beneath such bevel into the other sheet forming an effective junction. At the portion where the sole is inserted, and four sheets as well as the separator in the doubled sheet are cut through, the bevel 29 on the face of the die is considerably steeper. In each case the bevel inclines inwardly toward the upper platen 30, and thus while its outermost edge cuts through the stock into the paper sheet 14 the face of the bevel effects the seam. In contradistinction to this the reaches 27 and 28 of the die have their inside edges substantially vertical and their external bevels are simply sufficient to provide proper material for the die itself.

It will be seen that such a die as described not only cuts out an outline of the gaiter or other article of footwear, but joins the side portions directly together and also forms two seams between the sides and opposite edges of the sole portion. The sole portion is preferably made considerably thicker than the rest of the material, as indicated in Figs. 3 and 8. After the sheets have been assembled, under hydraulic pressure, the press is closed, bringing the die into the position shown in Figs. 2 and 3. Then, when the press-platens are separated they leave the joined and cut-away article free from the waste portion of the sheets.

After the formation of the body portion of the shoe, we fold out the sole portion 12 and insert in it, through the space at the rear thereof, a temporary sole former 40, which may readily be a piece of paste-board, to maintain the sole flat until after vulcanization.

Before vulcanization we apply suitable reinforces to the article, primarily strips of rubber cemented in place over the seams. Thus, we apply one strip 50 (Fig. 7) at the front, another one at 51 at the back, a strip 52 extending about the top of the gaiter, one 53 extending about the junction at the sides and sole, and a strip 54 about the heel opening. The strips 50 and 51 are approximately flat; the strip 52 and 54 doubled on themselves, and the strip 53 bent at right angles to itself, as will be apparent from Figs. 7 and 8. A small reinforcement 55 may be added at the toe over the junctions of the strips 50 and 53.

The reinforcements are preferably pressed into place by a suitable hand roller, the seamed parts being supported at the time by an inside former, which may be no more than properly formed bars or rods to resist the pressure.

After the article has been cut out, joined and reinforced as described, it is vulcanized in any suitable manner, as by heat, vapor cure or acid cure. We find during such vulcanization it is not necessary to mount the article on any special form. The whole operation of forming the article and curing it may be accordingly done very cheaply and quickly.

Fig. 7 shows one form of footwear which may be made by our process. Figs. 9 and 10 illustrate another form, namely a sandal, which is cut out by a die having shallow beveled portions for making the front seams 61, the rear seams 62 and the two seams 63 where the sole 64 joins the sides, and having cutting portions for the open top 60 and the open heel portion 67. Suitable reinforcing strips are applied as seams and also at the open top and heel portions, as illustrated in Fig. 9.

Figs. 12 and 13 illustrate still another form of footwear, somewhat similar to the gaiter of Fig. 7 but being open at the back. The die 70 for forming such gaiter 6 is illustrated in Fig. 11. It has the seaming portions 71 and 72 for the front and sole, and cutting portions 73, 74 and 75 for the top, back and heel parts. We thus produce a gaiter having the sole 76, the same as the first described gaiter, but having the two side portions 77 disconnected at the back. One of these portions then has its edge doubled outwardly onto itself to make a reinforcement shown at 78, the other has its edge doubled inwardly to make the reinforcement 79. These two reinforced edges may then be provided with the corresponding members of snap fasteners 80 and 81, thus making a gaiter open at the rear and adapted to be readily put in place. Such gaiter if desired may have a comparatively long leg and still be very readily applied.

The different forms of footwear shown are to be taken as illustrative of any form which may be made by our process. It will be seen that in all the forms shown, one operation of the die is sufficient to join the top parts to the sole and make the necessary junctions between the top parts, and to cut out such joined body from the surplus rubber.

The beveled edges which cut and join the sole to the side (24, Fig. 1; 72, Fig. 11) are bowed outwardly approximately as shown to give a sufficient width and the proper shape to the sole. The doubled portion of rubber inserted for the sole is placed so that the fold 15 lies in a line adapted to intersect the junction of the front and sole-seaming edges of the die. This doubled insert is also placed so that the rear edge 16 is in position adapted to intersect the junction of the sole portion 24 and the cutting heel portion 27 of the die. This position of the doubled portion causes the fold to come at all times beneath the top seam to the very point of the seam, also causes the rear portion of the forming sole to extend substantially straight across the shoe.

Our method of manufacture is simple, and rapid in its operation, and may be used to produce a variety of footwear, as indicated by the few illustrations given. The rubber stock employed is preferably raw rubber treated with sufficient soap stone or starch to prevent the sheets normally adhering when placed on top of each other, but enabling them to firmly adhere when pressed by heavy hydraulic pressure supplied by the press. The footwear produced preferably has its upper of light thin rubber and its sole of materially heavier stock. It is accordingly efficient for protection against the weather, but is also adapted to be readily folded into a small compass when not in use.

Having thus described our invention, we claim:

1. The method of making articles of plastic material comprising superimposing a series of sheets, and by pressure forming in one region a plurality of surmounting cut seams, in another region a single cut seam, and in still another region a severance of sheets without forming a seam all at the same time.

2. The method of making articles of plastic material comprising superimposing a pair of sheets with an intermediate doubled sheet and simultaneously joining, by a cut seam, each sheet of the pair to the adjacent layer of the doubled sheet, and at the same time cutting through the two sheets of the pair beyond the doubled sheet, without forming a seam at the margin cut through.

3. The method of making articles of plastic material comprising inserting a doubled sheet between two sheets of a pair, and by a single movement joining, by a cut seam, the doubled sheet to the adjacent members of the pair in certain regions, joining the two members of the pair together in other regions, and cutting through such members of the pair without joining them in still other regions.

4. The method of making rubber footwear consisting of superimposing a pair of sheets of rubber with an intermediate doubled sheet of rubber, and simultaneously joining, by a cut seam, each sheet of the pair to the adjacent layer of the doubled sheet, and at the same time cutting through the two sheets of the pair beyond the doubled sheet without forming a seam at the margin cut through, and thereafter vulcanizing the joined article.

5. The method of making footwear comprising superimposing a pair of rubber sheets with an intermediate doubled rubber sheet, and by pressure in one direction forming a cut seam between each sheet of said pair and the adjacent layer of the doubled sheet in one region, and in another region forming a cut seam directly between two sheets of the pair, and in still another region cutting through the two sheets of the pair without forming a seam, all at the same time.

6. The method of making articles of plastic material comprising taking a pair of comparatively thin sheets of such material, placing between them a doubled sheet of comparatively thick stock with its fold facing outwardly, such doubled sheet only occupying a portion of the area of the pair of sheets, and cutting out the article including cutting through the doubled sheet and the adjacent sheets and at the same time forming a seam at the junction of the doubled sheet and the adjacent sheets.

7. The method of making rubber footwear comprising taking a pair of comparatively thin sheets of rubber, placing between them a doubled sheet of thicker stock with its fold facing outwardly, such doubled sheet being suitable for a sole, cutting out the article and at the same time joining by a cut seam the doubled sheet to the adjacent sheets at the edges of the sole and at the same time forming a junction of sheets of said pair at the front of the upper.

8. The method of making articles of plastic material comprising placing a doubled sheet between a portion of two outer sheets, cutting through such pile of sheets by a single outline die which in the region common to the doubled sheet and the two outside sheets forms a pair of cut seams between them respectively, and in another region, cuts through the two outer sheets without forming a seam.

9. The method of making rubber articles comprising placing a doubled sheet of rubber between a portion of two outer sheets of rubber, cutting through such pile of sheets by a single outline die which in the region common to the doubled sheet and the two outside sheets forms two surmounting cut seams between them respectively, in another region cuts through the two outer sheets, and in still another region joins the outer sheets directly together.

10. The method of making rubber footwear comprising placing a doubled sheet of rubber between a portion of two outer sheets of rubber, cutting through such pile of sheets by a single outline die which in the region common to the doubled sheet and the two outside sheets forms two surmounting cut seams respectively between an outer sheet and the adjacent leaf of the doubled sheet and cuts through all of the sheets outside of such seam and in another region joins the two outer sheets directly together and cuts through them outside of such seam, and in another region cuts through the two outer sheets without making a seam.

11. A method of making rubber footwear comprising placing a doubled portion for the sole between two rubber sheets for the sides, pressing such pile of sheets by a single die having its edges formed to join the two rubber sheets together at the front and to join each sheet to the sole at the bottom by means of cut seams, and to cut through the two sheets at the rear of the sole portion to leave an open heel.

12. A method of making rubber footwear comprising placing a doubled portion for the sole between two rubber sheets for the sides, pressing such pile of sheets by a single die having its edges formed to join the two rubber sheets together at the front and to join each sheet to the sole at the bottom by means of cut seams, and to cut through the two sheets at the top to leave an open top.

13. The method of making footwear comprising placing a doubled sheet of comparatively thick material suitable for a sole between two sheets of comparatively thin material suitable for the side portions and top, then joining in one operation said two sheets together by a cut seam at the front of the footwear and at the same time joining each of said sheets to the doubled sheet at the edge of the sole.

14. The method of making footwear comprising placing a doubled sheet of rubber for the sole portion between two sheets of rubber for the side portions and top, then joining in one operation said two sheets together by a seam at the front of the footwear and at the same time joining each side sheet to the doubled sheet at the edge of the sole, and thereafter flattening out the doubled sole and vulcanizing it in that condition.

15. The method of making footwear comprising placing a doubled sheet for the sole between two other sheets for the sides and top, joining the sole to the sides and joining the two sides together at the top by cut seams and at the same time cutting such portions free from the external stock, thereafter unfolding the sole to make it flat, and vulcanizing the article while the sole is in that condition.

16. The method of making articles of plastic material comprising placing a doubled sheet between two other sheets, joining each outer sheet to the adjacent leaf of the doubled sheet, joining the two sheets directly together in another region by cut seams, thereafter unfolding the double portion, inserting a temporary former adjacent such unfolded portion and curing the article.

17. The method of making rubber footwear comprising placing a doubled sheet of rubber for the sole between two other sheets of rubber for the sides and top, joining the sole to the sides and joining the two sides together at the top by cut seams, and at the same time cutting such portions free from the external stock, thereafter unfolding the sole, inserting a removable plate extending across the line of fold in such sole, and vulcanizing the article.

18. The method of making footwear comprising inserting a doubled portion for the sole between two sheets for the sides, cut seaming together the two side portions at the front and each side portion to the sole, and thereafter unfolding the sole and applying reinforcing strips overlapping the edge portions of the sole and sides.

19. The method of making footwear comprising cutting with an outline die through a pair of rubber sheets comprising two outer sheets and an intermediate doubled sheet with its folded edge within the circuit of the die and with a separator between its leaves, said die having a portion which has a shallow bevel which forms a cut seam between the side sheets at the front and another beveled portion which forms a cut seam between the sides and the sole, and another portion which is sufficiently sharp to cut through the side sheets without joining them.

In testimony whereof, we hereunto affix our signatures.

FRED THOMAS ROBERTS.
ALBERT J. ELDON.